US009665066B2

(12) United States Patent
Kim et al.

(10) Patent No.: US 9,665,066 B2
(45) Date of Patent: May 30, 2017

(54) COMPLEX SPATIAL LIGHT MODULATOR AND METHOD OF FABRICATING THE SAME

(71) Applicant: Electronics and Telecommunications Research Institute, Daejeon (KR)

(72) Inventors: Yong Hae Kim, Daejeon (KR); Chi-Sun Hwang, Daejeon (KR); Gi Heon Kim, Daejeon (KR); Hojun Ryu, Seoul (KR); Chunwon Byun, Yongin-si (KR); Himchan Oh, Seoul (KR); Myung Lae Lee, Daejeon (KR); Hye Yong Chu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 198 days.

(21) Appl. No.: 14/503,234

(22) Filed: Sep. 30, 2014

(65) Prior Publication Data

US 2015/0323817 A1   Nov. 12, 2015

(30) Foreign Application Priority Data

May 12, 2014 (KR) ........................ 10-2014-0056633

(51) Int. Cl.
  *G02F 1/1335* (2006.01)
  *G03H 1/22* (2006.01)
  (Continued)

(52) U.S. Cl.
  CPC ............. *G03H 1/02* (2013.01); *G02F 1/0121* (2013.01); *G02F 1/133528* (2013.01);
  (Continued)

(58) Field of Classification Search
  CPC ....................... G03H 2225/33; G03H 2225/34
  See application file for complete search history.

(56) References Cited

U.S. PATENT DOCUMENTS 5,426,521 A * 6/1995 Chen ................. G02B 27/0025
  359/29
5,589,955 A * 12/1996 Amako ................ B23K 26/066
  359/10
(Continued)

FOREIGN PATENT DOCUMENTS

WO    WO 2010-149588 A1    12/2010

OTHER PUBLICATIONS

R Tudela, et al., "Full complex Fresnel holograms displayed on liquid crystal devices", Journal of Optics A: Pure and Applied Optics, vol. 5, pp. S189-S194, Aug. 22, 2003.
(Continued)

Primary Examiner — Ryan Crockett
(74) Attorney, Agent, or Firm — Rabin & Berdo, P.C.

(57) ABSTRACT

Provided are a spatial light modulator (SLM) and a method of fabricating the same. The complex spatial light modulator includes a thin film transistor (TFT) layer provided on a substrate, an amplitude type SLM and a phase type SLM electrically connected to the TFT layer, and a first polarizer provided on the phase type SLM, wherein the TFT layer includes transistors electrically connected to the amplitude type SLM and the phase type SLM, respectively, and the amplitude type SLM and the phase type SLM are commonly and electrically connected to the TFT layer and driven.

15 Claims, 24 Drawing Sheets

(51) Int. Cl.
*G03H 1/02* (2006.01)
*G02F 1/01* (2006.01)
*G02F 1/157* (2006.01)
*G02F 1/163* (2006.01)

(52) U.S. Cl.
CPC ........... *G02F 1/157* (2013.01); *G03H 1/2294* (2013.01); *G02F 2001/1635* (2013.01); *G02F 2201/44* (2013.01); *G03H 2001/0224* (2013.01); *G03H 2225/22* (2013.01); *G03H 2225/33* (2013.01)

(56) References Cited

U.S. PATENT DOCUMENTS

| | | | |
|---|---|---|---|
| RE39,642 E * | 5/2007 | Gobeli | 359/254 |
| 2005/0007517 A1* | 1/2005 | Anandan | G02F 1/133603 349/69 |
| 2006/0002141 A1* | 1/2006 | Ouderkirk | G02B 6/0001 362/609 |
| 2006/0043184 A1* | 3/2006 | Fukuchi | G03H 1/08 235/454 |
| 2009/0316240 A1* | 12/2009 | Hara | G11B 7/0065 359/33 |
| 2010/0051951 A1* | 3/2010 | Lee | G02F 1/136209 257/59 |
| 2010/0321615 A1* | 12/2010 | Thornes | H01S 3/0057 349/99 |
| 2011/0109955 A1 | 5/2011 | Park et al. | |
| 2012/0092735 A1 | 4/2012 | Futterer et al. | |

OTHER PUBLICATIONS

Don A. Gregory, et al., "Full complex modulation using liquid-crystal Televisions", Applied Optics, vol. 31, No. 2, pp. 163-165, Jan. 10, 1992.

Stephan Reichelt, et al., Full-range, complex spatial light modulator for real-time holography, Optics Letters, vol. 37, No. 11, pp. 1955-1957, Jun. 1, 2012.

* cited by examiner

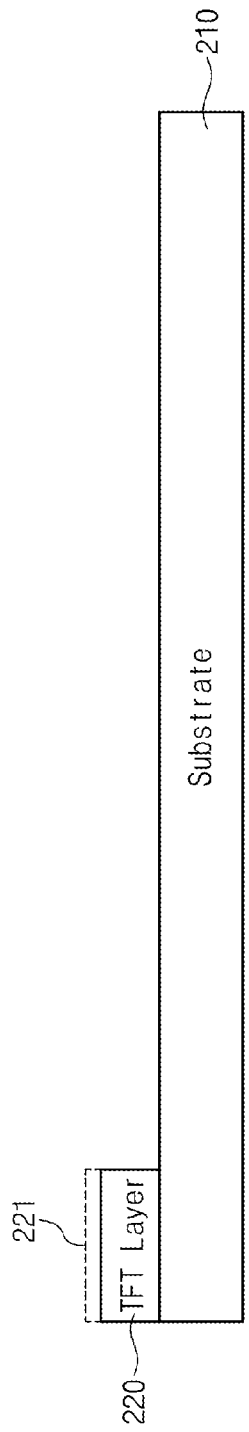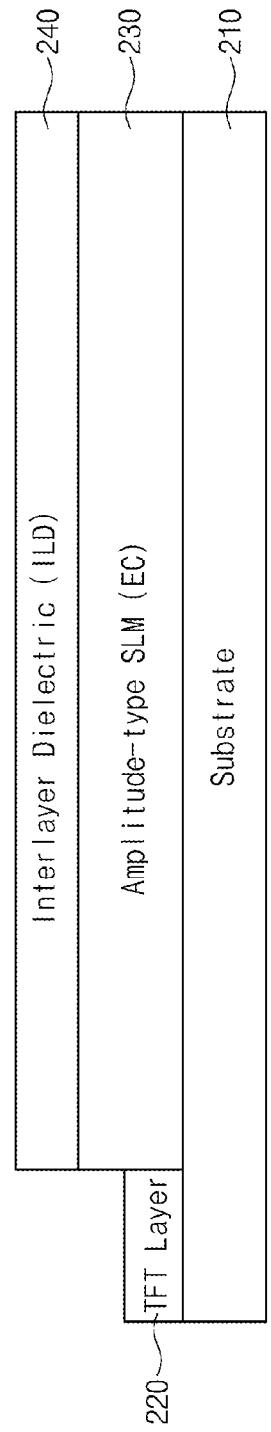

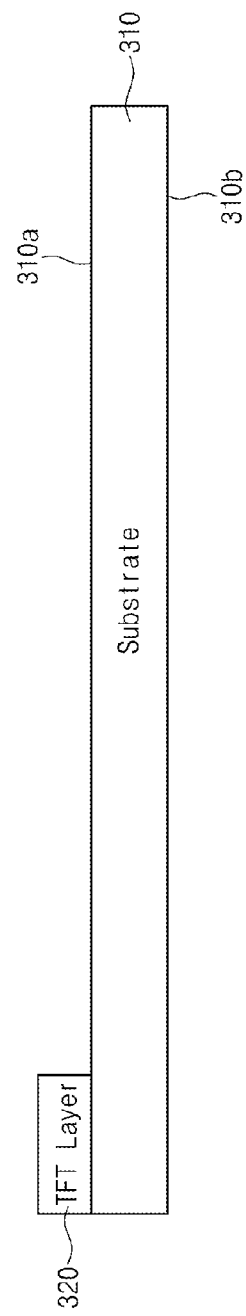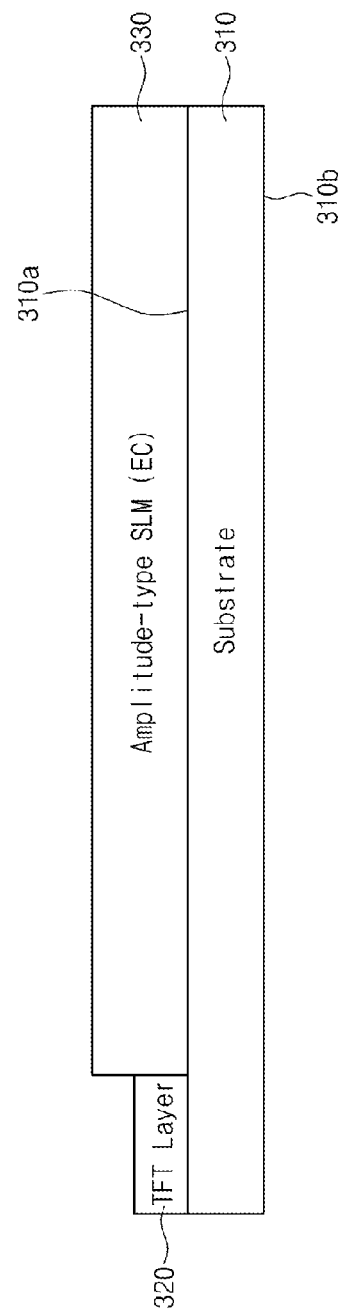

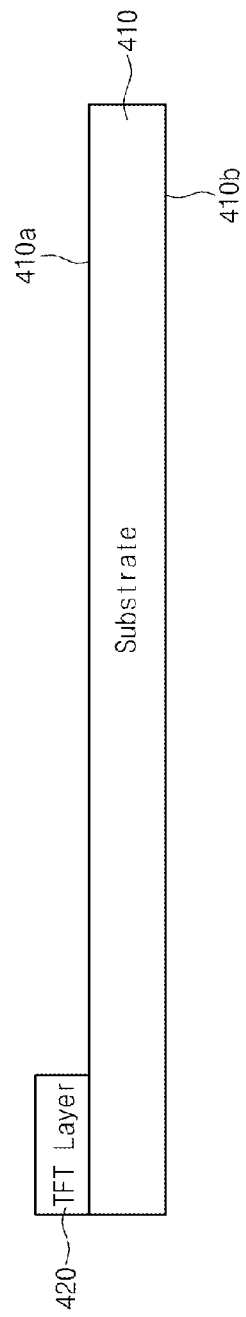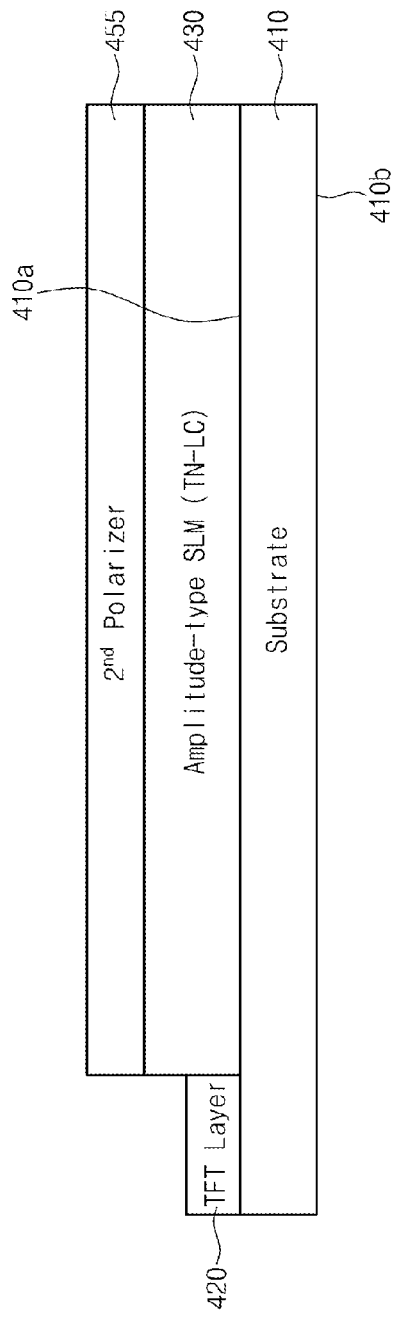

US 9,665,066 B2

COMPLEX SPATIAL LIGHT MODULATOR AND METHOD OF FABRICATING THE SAME

CROSS-REFERENCE TO RELATED APPLICATIONS

This U.S. non-provisional patent application claims priority under 35 U.S.C. §119 of Korean Patent Application No. 10-2014-0056633, filed on May 12, 2014, the entire contents of which are hereby incorporated by reference.

BACKGROUND OF THE INVENTION

The present invention disclosed herein relates to a spatial light modulator (SLM) and a method of fabricating the same, and more particularly, to a complex spatial light modulator and a method of fabricating the same.

An SLM is widely used for displaying digital hologram. Currently released SLMs may be divided into an amplitude type or a phase type, and be fabricated by mainly using the liquid crystal and a polarizer. Among them, the phase type SLMs are mainly used due to good diffraction efficiency. However, the phase type SLM is difficult to perfectly reproduce a hologram and only approximates a complex SLM. Accordingly, in order to display a perfect hologram, a complex SLM is necessary.

As a method of implementing the complex SLM, there are a software method and a hardware method. The software method is for specifically applying modulation to a phase type SLM and allows it to have characteristics of an amplitude type SLM, too. However, the software method does not represent perfect complex spatial characteristics. The hardware method is to consecutively use an amplitude type SLM and a phase type SLM. However, since this method uses two spatial SLMs, there are limitations of alignment and diffraction between the two SLMs.

SUMMARY OF THE INVENTION

The present invention provides a complex spatial light modulator (SLM) without limitation in alignment by including an amplitude type SLM and phase type SLM in one device and a method of fabricating the same.

Embodiments of the present invention provide complex spatial light modulators (SLMs) including: a thin film transistor (TFT) layer provided on a substrate; an amplitude type SLM and a phase type SLM electrically connected to the TFT layer; and a first polarizer provided on the phase type SLM, wherein the TFT layer includes transistors electrically connected to the amplitude type SLM and the phase type SLM, respectively, and the amplitude type SLM and the phase type SLM are commonly and electrically connected to the TFT layer and driven.

In some embodiments, the amplitude type SLM and the phase type SLM may be provided on a first surface of the substrate, and the amplitude type SLM may be provided between the first surface of the substrate and the phase type SLM.

In other embodiments, the SLM may further include a reflecting plate provided between the TFT layer and the amplitude type SLM.

In still other embodiments, the TFT layer may be provided on a side wall of the amplitude type SLM.

In even other embodiments, the SLM may further include a contact electrically connecting the TFT layer and the phase type SLM.

In yet other embodiments, the phase type SLM may include parallel-aligned nematic liquid crystal (PAN-LC).

In further embodiments, the amplitude type SLM may include an electrochromic (EC) device.

In still further embodiments, the amplitude type SLM may include a twisted nematic LC (TN-LC).

In even further embodiments, the amplitude type SLM may be provided on a first surface of the substrate and the phase type SLM may be provided on a second surface which is opposite to the first surface.

In yet further embodiments, the TFT layer may be provided on a side wall of the amplitude type SLM.

In much further embodiments, the SLM may further include a second polarizer provided on the amplitude type SLM.

In other embodiments of the present invention, complex SLMs includes: a TFT layer provided on a substrate; a plurality of light modulator sets electrically connected to the TFT layer; and a first polarizer provided on the plurality of light modulator sets, wherein each of the plurality of light modulator sets comprises an amplitude type SLM and a phase type SLM electrically connected to the TFT layer, and the amplitude type SLM and the phase type SLM are commonly and electrically connected to the TFT layer and driven.

In some embodiments, the substrate may include a first surface on which the TFT layer is provided and a second surface which is opposite to the first surface, a plurality of amplitude type SLMs included in the plurality of light modulator sets are disposed on the TFT layer provided on the first surface of the substrate, and a plurality of phase type SLMs included in the plurality of light modulator sets are disposed on the second surface of the substrate.

In other embodiments, the substrate may include a first surface on which the TFT layer is provided and a second surface which is opposite to the first surface, a plurality of amplitude type SLMs included in the plurality of light modulator sets may be disposed on the TFT layer provided on the first surface of the substrate, and a plurality of phase type SLMs included in the plurality of light modulator sets may be disposed on the plurality of amplitude type SLMs.

In still other embodiments of the present invention, fabricating methods of a complex SLM, include: forming a TFT layer on a substrate; forming an amplitude type SLM and a phase type SLM electrically connected to the TFT layer; and forming a first polarizer on the phase type SLM.

In some embodiments, the forming of the amplitude type SLM and the phase type SLM may include: forming the amplitude type SLM on a first surface of the substrate; and forming the phase type SLM on the amplitude type SLM.

In other embodiments, the fabricating method may further include forming a reflecting plate after the forming of the TFT layer.

In still other embodiments, the forming of the amplitude type SLM and the phase type SLM may include: forming the amplitude type SLM on a first surface of the substrate; and forming the phase type SLM on a second surface which is opposite to the first surface on the substrate.

In even other embodiments, the fabricating method may further include etching the substrate and making the substrate thin after the forming of the amplitude type SLM.

In yet further embodiments, the fabricating method may further include forming a second polarizer on the amplitude type SLM after the fabricating of the amplitude type SLM.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIGS. 2C to 2F are cross-sectional views illustrating a fabricating method of a complex SLM according to another embodiment of the present invention;

FIGS. 3C to 3F are cross-sectional views illustrating a fabricating method of a complex SLM according to another embodiment of the present invention;

FIGS. 4C to 4F are cross-sectional views illustrating a fabricating method of a complex SLM according to another embodiment of the present invention.

DETAILED DESCRIPTION OF PREFERRED EMBODIMENTS

Figure 1A:
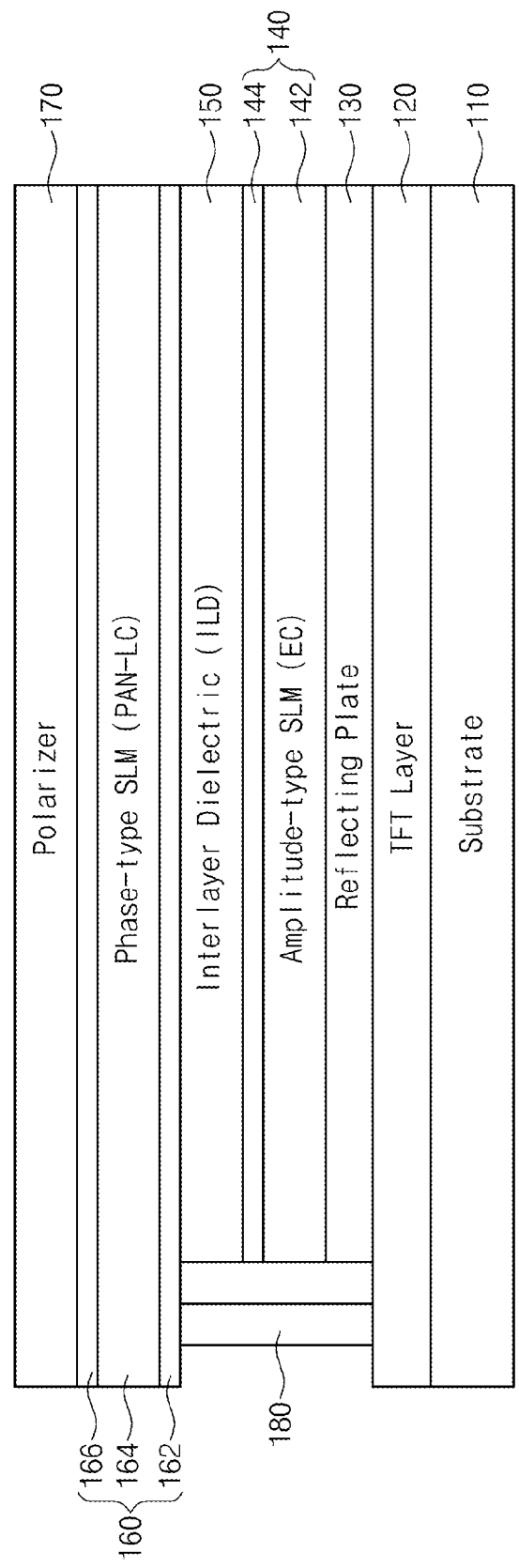
FIG. 1A is a cross-sectional view illustrating a complex spatial light modulator (SLM) according to an embodiment of the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Like reference numerals refer to like elements throughout.

In the drawings, the dimensions of layers and regions are exaggerated for clarity of illustration. It will also be understood that when a layer (or film) is referred to as being 'on' another layer or substrate, it can be directly on the other layer or substrate, or intervening layers may also be present. Further, it will be understood that when a layer is referred to as being 'under' another layer, it can be directly under, and one or more intervening layers may also be present. In addition, it will also be understood that when a layer is referred to as being 'between' two layers, it can be the only layer between the two layers, or one or more intervening layers may also be present.

Hereinafter, it will be described about a complex spatial light modulator (SLM) and a method of fabricating the same according to exemplary embodiments of the present invention in conjunction with the accompanying drawings.

Figure 1B:
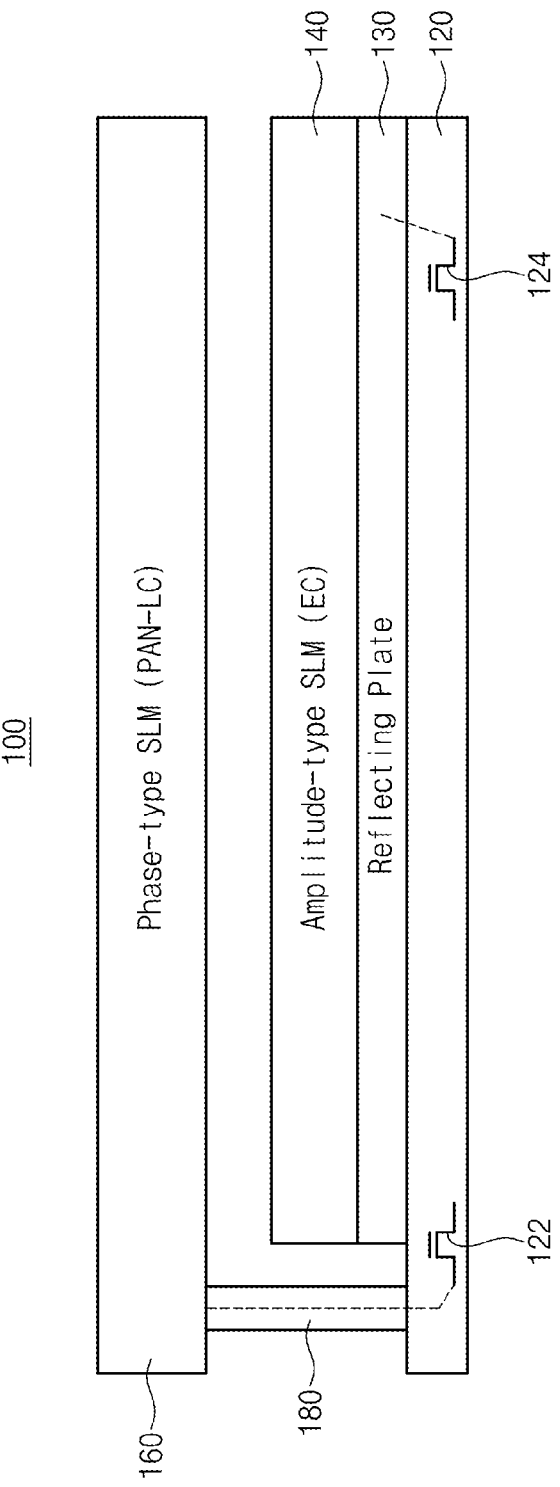
FIG. 1B is a cross-sectional view illustrating electrical connections of the complex SLM in FIG. 1A.

FIG. 1A is a cross-sectional view illustrating a complex SLM according to an embodiment of the present invention. FIG. 1B is a cross-sectional view illustrating electrical connections of the complex SLM in FIG. 1A.

Referring to FIGS. 1A and 1B, a complex SLM 100 may be a reflective complex SLM. As an example, the reflective complex SLM 100 may include a substrate 110, a thin film transistor (TFT) layer 120, a reflecting plate 130, an amplitude type SLM 140, a interlayer dielectric (ILD) 150, a phase type SLM 160, a polarizer 170, and a contact 180 connecting the TFT layer 120 and the phase type SLM 160.

The TFT layer 120 may be formed on the substrate 110. The substrate 110 may include glass or silicon. The TFT layer 120 may include, as illustrated in FIG. 1B, at least two TFTs 122 and 124. The TFTs 122 and 124 in the TFT layer 120 may provide data voltages from data lines to the amplitude type SLM 140 and the phase type SLM 150 in response to a scan pulse of a gate line.

The reflecting plate 130 may be formed on the TFT layer 120. The reflecting plate 130 may have a smaller width than the TFT layer 120.

A drain of one TFT 124 in the TFT layer 120 connected to the reflecting plate 130, and the TFT layer 120 and the amplitude type SLM 140 may be electrically connected. For example, the reflecting plate 130 may be used as an anode of the amplitude type SLM 140. A drain of another TFT 122 in the TFT layer 120 is connected to the contact 180, and the TFT transistor layer 120 and the phase SLM 160 may be electrically connected. According to an example, the amplitude type SLM 140 and the phase type SLM 160 are commonly and electrically connected to the TFT layer 120, and the TFTs 122 and 124 may drive the amplitude type SLM 140 and the phase type SLM 160, respectively.

The amplitude type SLM 140 may be formed on the reflecting plate 130. The amplitude type SLM 140 may have the same width as the reflecting plate 130. The amplitude type SLM 140 may include, for example, an electrochromic (EC) device 142 and an EC cathode 144. The EC device 142 may have characteristics of absorbing a light according to a voltage and a current. Accordingly, the EC device 142 may be suitable for the amplitude type SLM 140. The EC device 142 may have an inorganic EC material such as tungsten oxide ($WO_3$), nickel hydroxide ($NiO_xH_y$), niobium oxide ($Nb_2O_5$), vanadium pentoxide ($V_2O_5$), titanium dioxide ($TiO_2$), and molybdenum trioxide ($MoO_3$), a single molecular material such as viologen, or an organic EC material such as polyaniline, and polythiophene. The EC cathode 144 may include a transparent conductive material such as indium tin oxide (ITO) or indium zinc oxide (IZO).

The ILD 150 may be formed on the amplitude type SLM 140. The ILD 150 may include any one of silicon oxide ($SiO_x$), silicon nitride ($SiN_x$), or a combination thereof. The ILD 150 may electrically insulate the amplitude type SLM 140 from the phase type SLM 160.

The phase type SLM 160 may be formed on the ILD 150. The phase type SLM 160 may have the same width as the TFT layer 120. The phase type SLM 160 may include parallel aligned nematic liquid crystal (PAN-LC) 164, an LC anode 162, and an LC cathode 166. When there is no voltage taken between the LC anode 162 and the LC cathode 164, a major axis direction of LC molecules of the PAN-LC 164 may be horizontally oriented with a top surface of the substrate 110. When a voltage is applied to the PAN-LC 164, the major axis direction of the LC molecules may be tilted toward an electric field direction. Accordingly, a phase of a light passing through the phase type SLM 160 may be changed according to a refractive index difference of the LC molecules as the following Equation (1):

$$\Delta n = n_{\mathit{eff}} - n_0 = \frac{n_e n_0}{\sqrt{n_0^2 \sin^2\theta + n_e^2 \cos^2\theta}} - n_0 \quad (1)$$

where, θ denotes an angle that an LC molecule is tilted, $n_0$ denotes a refractive index of a minor axis direction of the LC molecule, $n_e$ denotes a refractive index of a major axis direction of the LC molecule, and $n_{\mathit{eff}}$ denotes a refractive index by the tilted angle of the LC molecule.

The PAN-LC 164 has characteristics that an amplitude is not changed and only a phase is changed for specific polarization. Accordingly, the polarizer 170 may be provided on the phase type SLM 160 including the PAN-LC 164. A polarization direction of the polarizer 170 may be matched with a rubbing direction of the PAN-LC 164. The LC anode 162 and the LC cathode 166 may include a transparent conductive material, such as, ITO or IZO.

The contact 180 may be formed on the TFT layer 120. The contact 180 may be separated from the reflecting plate 130 and the amplitude type SLM 140 by a predetermined interval. The contact 180 may be electrically connected the TFT layer 120 and the phase type SLM 160 in order to operate the phase type SLM 160.

The reflective complex SLM 100 of the present embodiment may be operated as follows.

An externally input light may be polarized (e.g., linear polarization) through the polarizer 170. When a voltage not smaller than a certain voltage is applied, the phase type SLM 160 may have saturated light transmission, a refractive index thereof may become differed despite of constant light transmission as the Equation (1), and then an optical path length may become differed. Accordingly, the light polarized by the polarizer 170 may be changed in phase according to a voltage applied to the phase type SLM 160.

When a voltage and a current are applied to the EC device 142 in the amplitude type SLM 140, the EC device 142 may have unique color through a redox reaction and wavelengths excluding that of the unique color are all absorbed. Therefore, when the voltage and current are applied, light absorption in the EC device 142 may be differed according to a wavelength. The light polarized and changed in phase by the polarizer 170 and the phase type SLM 160 may be changed in amplitude according to a voltage and a current applied to the amplitude type SLM 140 while passing through the amplitude type SLM 140. The light of which a phase and an amplitude are changed like this may be reflected by the reflecting plate 130 and changed again in phase and amplitude. For example, an electric field in the reflective complex SLM 100 may be modulated as the following Equation (2) and may represent complex light modulation characteristics:

$$E = 2A \exp(i2B) \quad (2)$$

where A denotes amplitude and B denotes a phase.

In the reflective complex SLM 100 of the present embodiment, one TFT layer 120 may drive all the amplitude type SLM 140 and the phase type SLM 160. Accordingly, the reflective complex SLM 100 may reduce energy consumption and a fabrication cost.

Figure 1C:
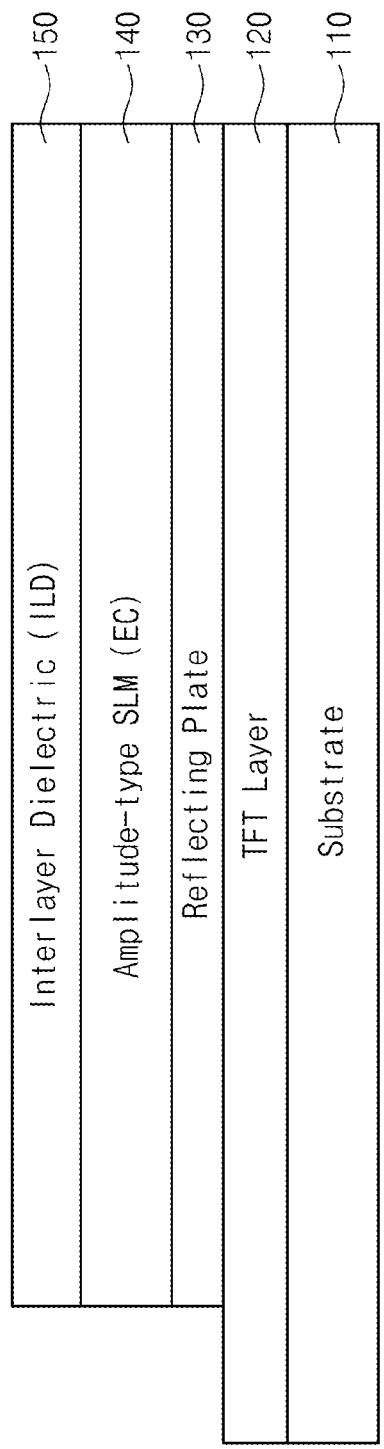
FIGS. 1C to 1E are cross-sectional views illustrating a fabricating method of a complex SLM according to an embodiment of the present invention.
Figure 1D:
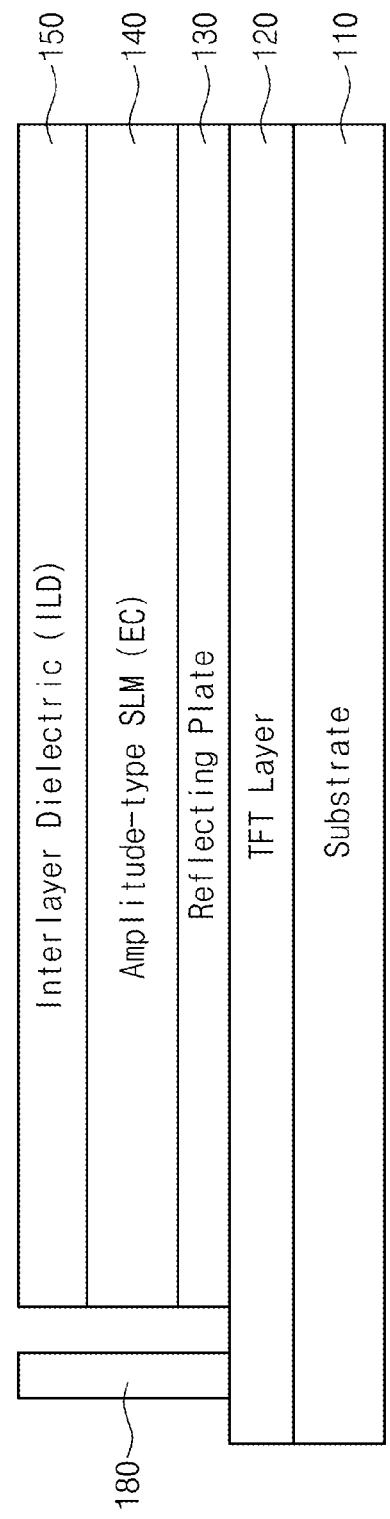
Figure 1E:
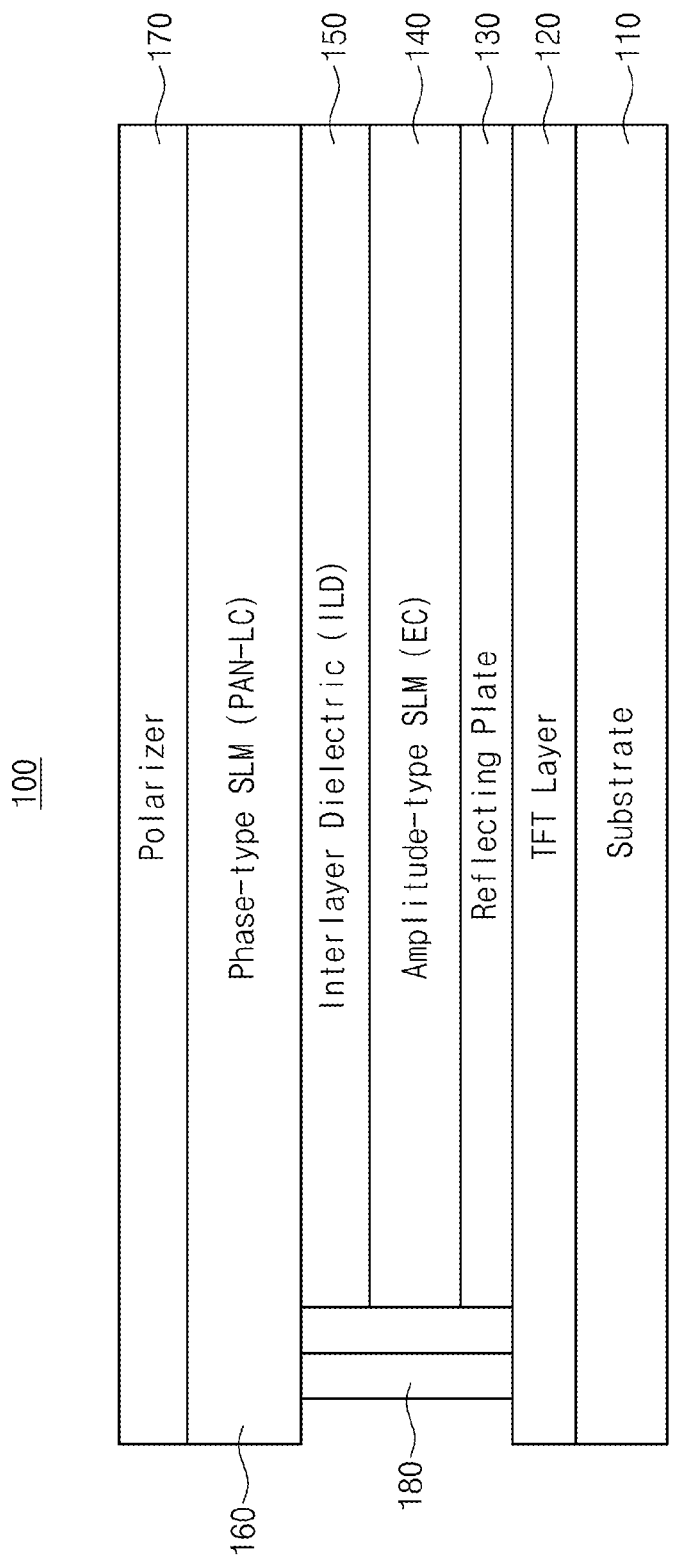

FIGS. 1C to 1E are cross-sectional views illustrating a fabricating method of a complex SLM according to an embodiment of the present invention.

Referring to FIG. 1C, the TFT layer 120, the reflecting plate 130, the amplitude type SLM 140 and the ILD 150 may be sequentially stacked. The reflecting plate 130, the amplitude type SLM 140 and the ILD 150 may be stacked on a part of the top surface of the TFT layer 120. The amplitude type SLM 140 may be electrically connected to the TFT layer 120 through the reflecting plate 130.

Referring to FIG. 1D, the contact 180 may be formed on the TFT layer 120. The contact 180 may be formed by using deposition of a conductor and a photo lithography method. The contact 180 may be formed at a predetermined interval from the reflecting plate 130, the amplitude type SLM 140 and the ILD 150.

Referring to FIG. 1E, the phase type SLM 160 and the polarizer 170 are sequentially stacked on the ILD 150. The phase type SLM 160 is connected to the contact 180 and electrically connected to the TFT layer 120. Accordingly, the phase type SLM 100 may be fabricated.

Figure 1F:
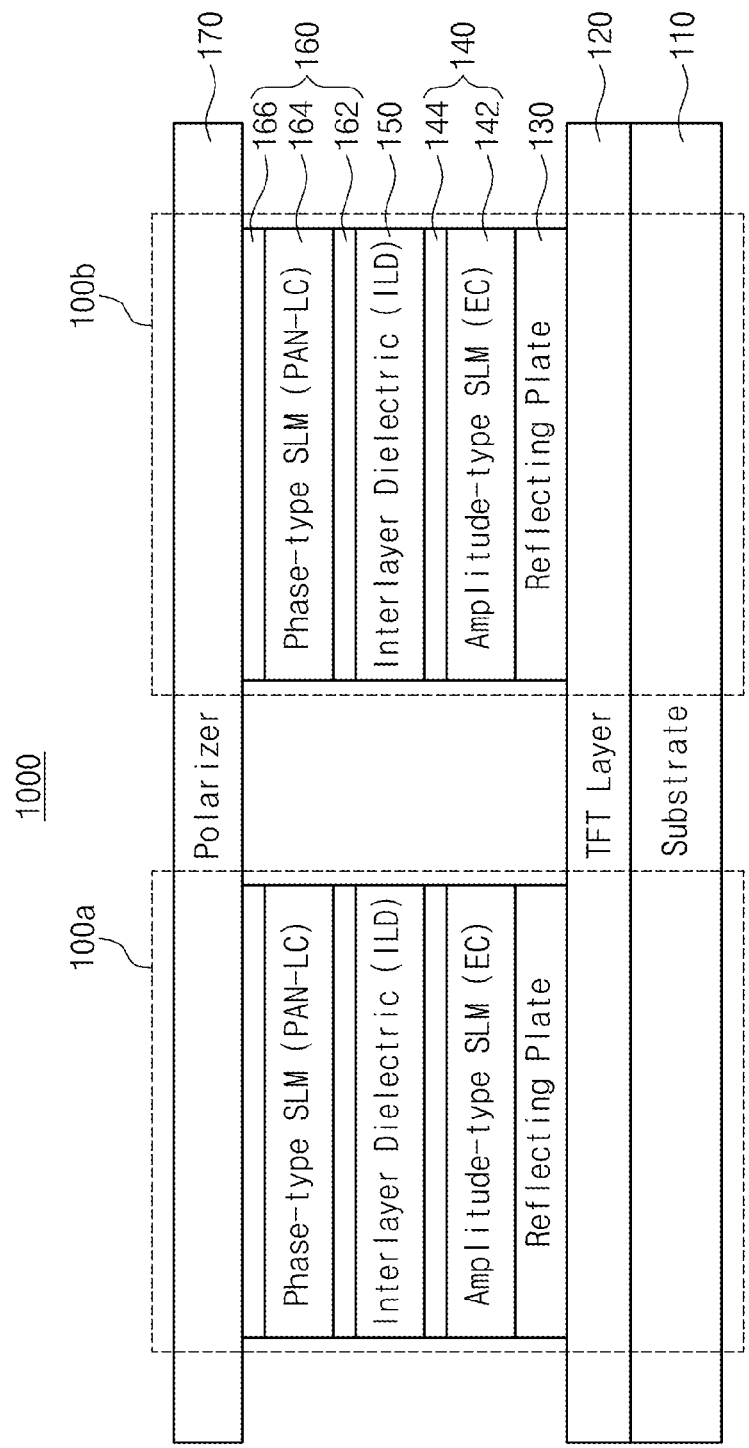
FIG. 1F is a cross-sectional view illustrating a modified example of the complex SLM in FIG. 1A.

FIG. 1F is a cross-sectional view illustrating a modified example of the complex SLM in the FIG. 1A. For conciseness of explanation, description about the substantially same elements as those described in relation to FIGS. 1A and 1B is omitted.

Referring to FIG. 1F, a complex SLM 1000 may include a plurality of complex SLMs arrayed on a substrate, for example, first and second complex SLMs 100a and 100b. The first and second complex SLMs 100a and 100b may be respectively configured as identical or similar to the reflective complex SLM 100 in FIG. 1A. The first and second complex SLMs 100a and 100b may share one TFT layer 120. Similarly, the first and second complex SLMs 100a and 100b may share one polarizer 170. As another example, the first and second complex SLMs 100a and 100b may share the reflecting plate 130.

In the present embodiment, the TFT layer 120 may include at least four TFTs. Electrical connections between the TFT layer 120 and the amplitude type SLM 140 and electrical connections between the TFT layer 120 and the phase type SLM 160 in the first complex SLM 100a may be identical or similar to those of the reflective complex SLM 100 in FIG. 1B. Electrical connections in the second complex SLM 100b may be similar to this.

The complex SLM 1000 may be formed by using a process identical or similar to that described in relation to FIGS. 1C to 1E.

Figure 2A:
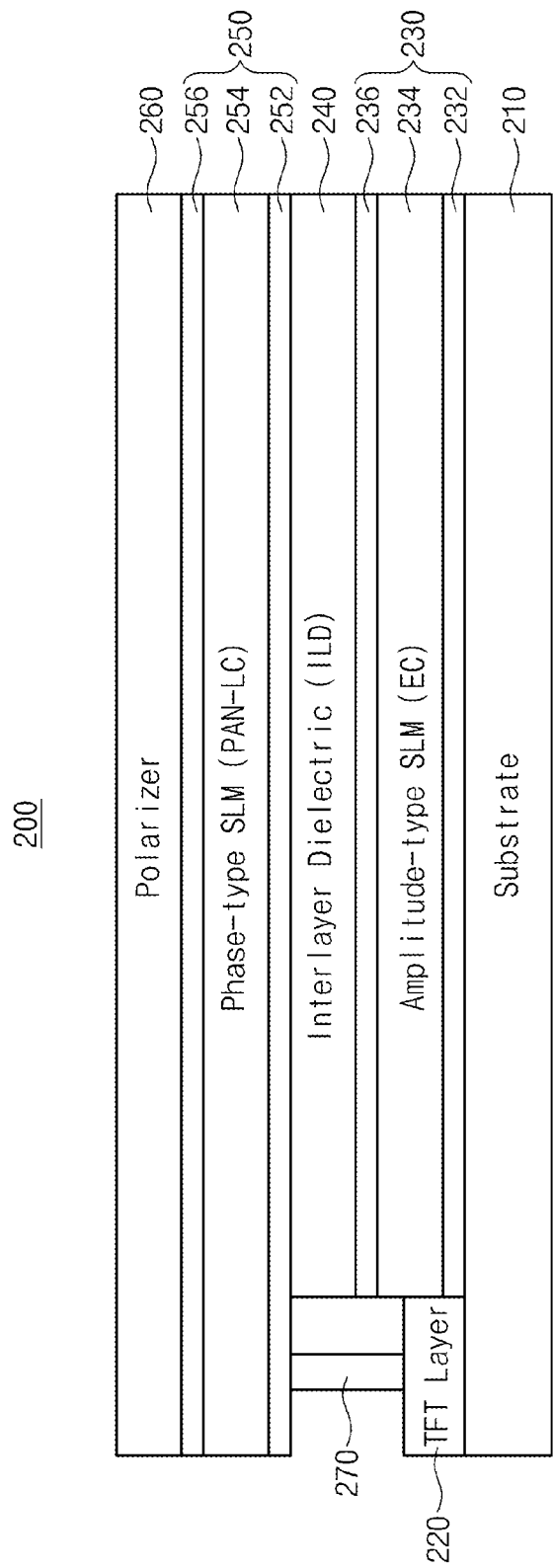
FIG. 2A is a cross-sectional view illustrating a complex SLM according to another embodiment of the present invention.
Figure 2B:
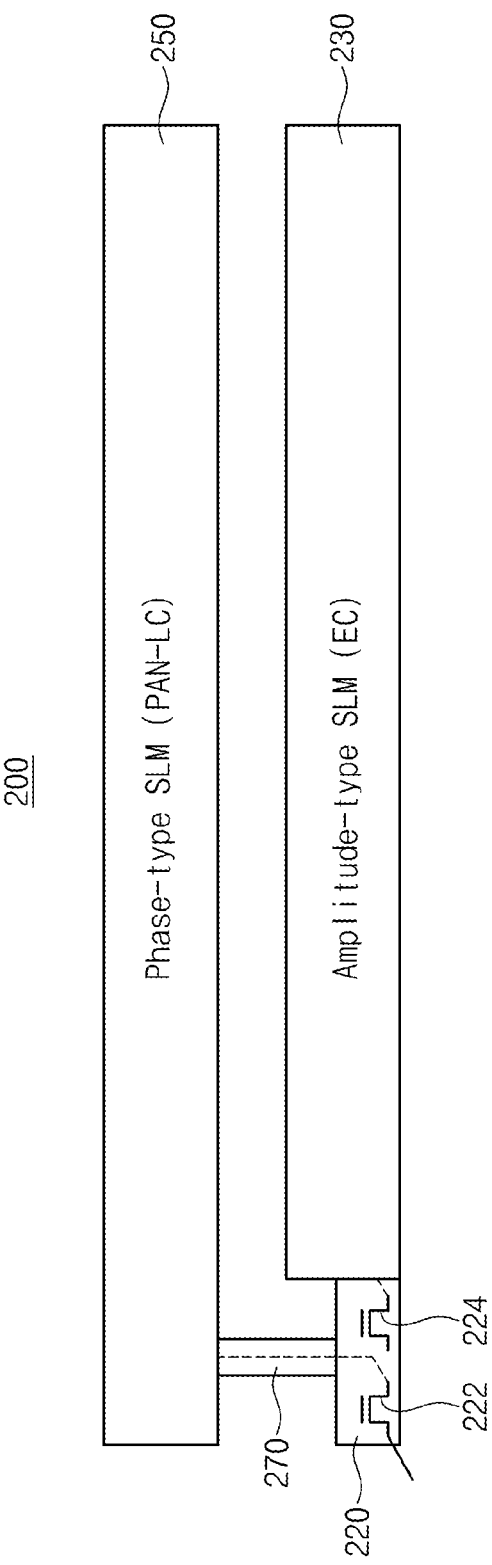
FIG. 2B is a cross-sectional view illustrating electrical connections of the complex SLM in FIG. 2A.

FIG. 2A is a cross-sectional view illustrating a complex SLM according to another embodiment, and FIG. 2B is a cross-sectional view illustrating electrical connections of the complex SLM in FIG. 2A.

Referring to FIGS. 2A and 2B, a complex SLM 200 may be a transmissive complex SLM without the reflecting plate 130 (in FIG. 1). As an example, the transmissive complex SLM 200 may include a amplitude type SLM 230, an ILD 240, a phase type SLM 250, and a polarizer 260, which are sequentially stacked on a substrate 210.

The amplitude type SLM 230 may include, for example, an EC device 234, an EC anode 232, and an EC cathode 236. The phase type SLM 250 may include, for example, a PAN-LC 254, an LC anode 252, and LC cathode 256. The TFT layer 220 may be provided on one edge of the amplitude type SLM 230. The amplitude type SLM 230 may be electrically connected to the TFT layer 220 through the EC anode 232 contacted to one TFT 224 in the TFT layer 220. The contact 270 may electrically connect the other TFT 222 in the TFT layer 220 to the phase type SLM 250, The transmissive complex SLM 200 may be configured not to allow an externally input light to pass the TFT layer 220. For example, an opaque metal layer may be formed on the TFT layer 220.

The transmissive complex SLM 200 of the present embodiment may be operated as follows.

An externally input light may be polarized (e.g., linear polarization) through the polarizer 260. When a voltage not lower than a certain voltage is applied, the phase type SLM 250 may have saturated light transmission, a refractive index thereof may become differed despite of constant light transmission as the Equation (1), and then an optical path length may become differed. Accordingly, the light polarized by the polarizer 260 may be changed in phase according to a voltage applied to the phase type SLM 250.

The light polarized and changed in phase by the polarizer 260 and the phase type SLM 250 may be changed in amplitude according to a voltage and a current applied to the amplitude type SLM 230 while passing through the amplitude type SLM 230. For example, an electric field in the transmissive complex SLM 200 may be modulated as the following Equation (3) and may represent complex light modulation characteristics:

$$E = A\exp(iB) \quad (3)$$

where, A denotes amplitude and B denotes a phase.

In the transmissive SLM 200 of the present embodiment, one TFT layer 220 may drive all the amplitude type SLM 230 and the phase type SLM 250. Accordingly, the transmissive complex SLM 200 may reduce energy consumption and a fabrication cost.

FIGS. 2C to 2F are cross-sectional views illustrating a fabricating method of a complex SLM according to another embodiment of the present invention.

Referring FIG. 2C, the TFT layer 220 may be formed on the substrate 210. The TFT layer 220 may be limitedly formed on a part of the top surface of the substrate, for example, on an edge of the top surface of the substrate 210. Optionally, an opaque metal layer 221 may be further formed on the TFT layer 220.

Referring to FIG. 2D, the amplitude type SLM 230 and an ILD 240 are sequentially formed on the substrate 210. The amplitude type SLM 230 may be formed on the side surface of the TFT layer 220 on the substrate 210. The amplitude type SLM 230 may be directly and electrically connected to the TFT layer 22.

Figure 2E:
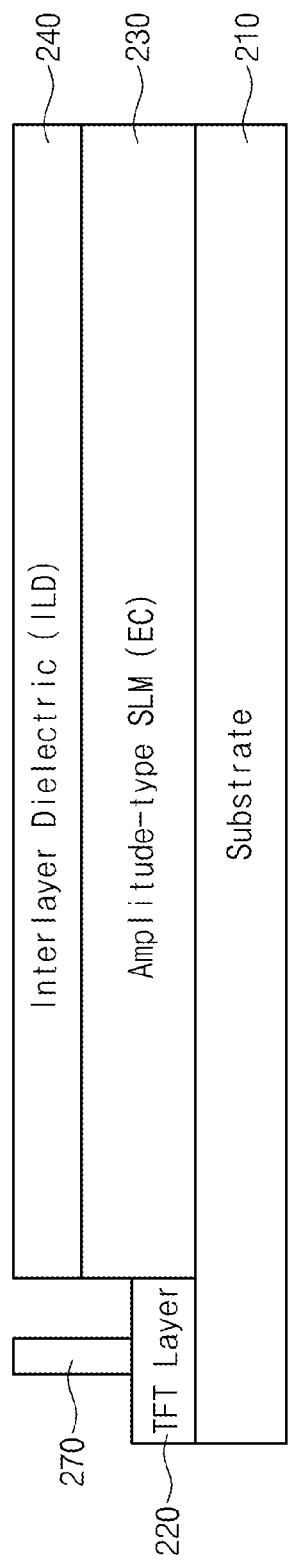

Referring to FIG. 2E, the contact 270 may be formed on the TFT layer 220. The contact 270 may be formed by using conductor deposition and a photolithography method. The contact 270 may be formed separately from the amplitude type SLM 230 and the ILD 240. The top surface of the contact 270 may have the same level as the ILD 140.

Figure 2F:
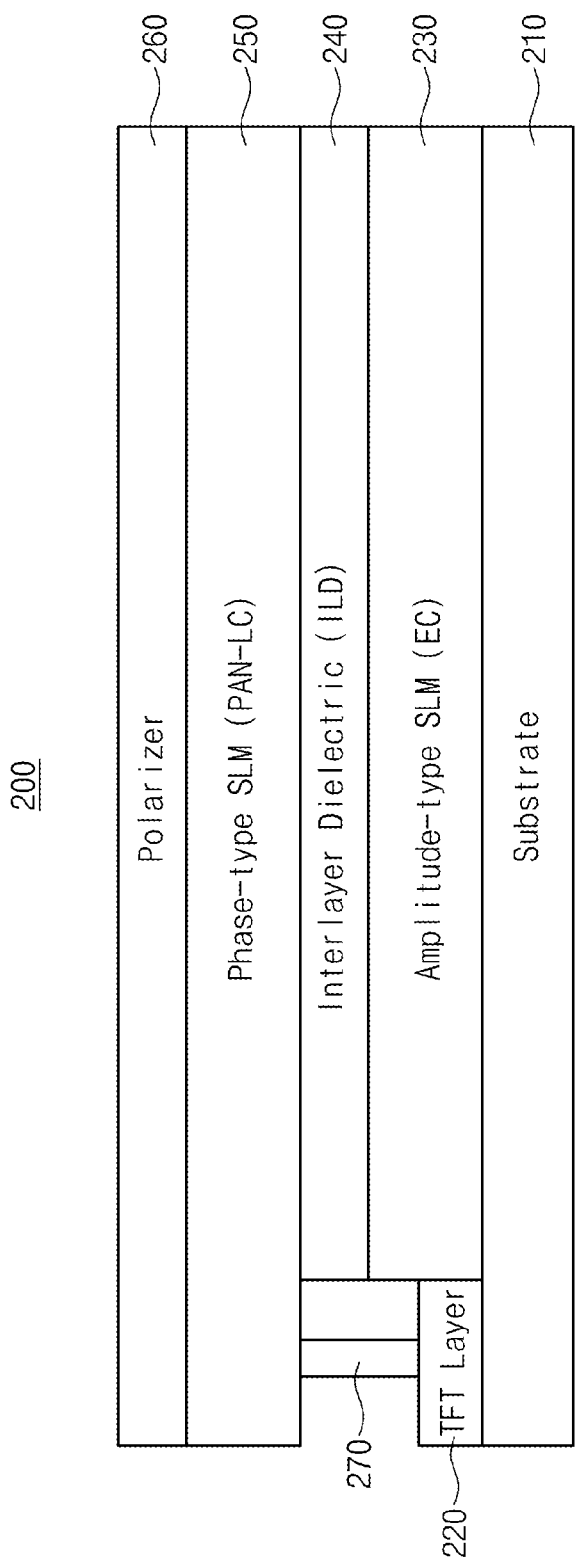

Referring to FIG. 2F, the phase type SLM 250 and the polarizer 260 may be sequentially formed on the ILD 240. The phase type SLM 250 may have one side thereof connected to the contact 270 and be electrically connected to the TFT layer 220. Accordingly, the transmissive complex SLM 200 may be fabricated.

Figure 2G:
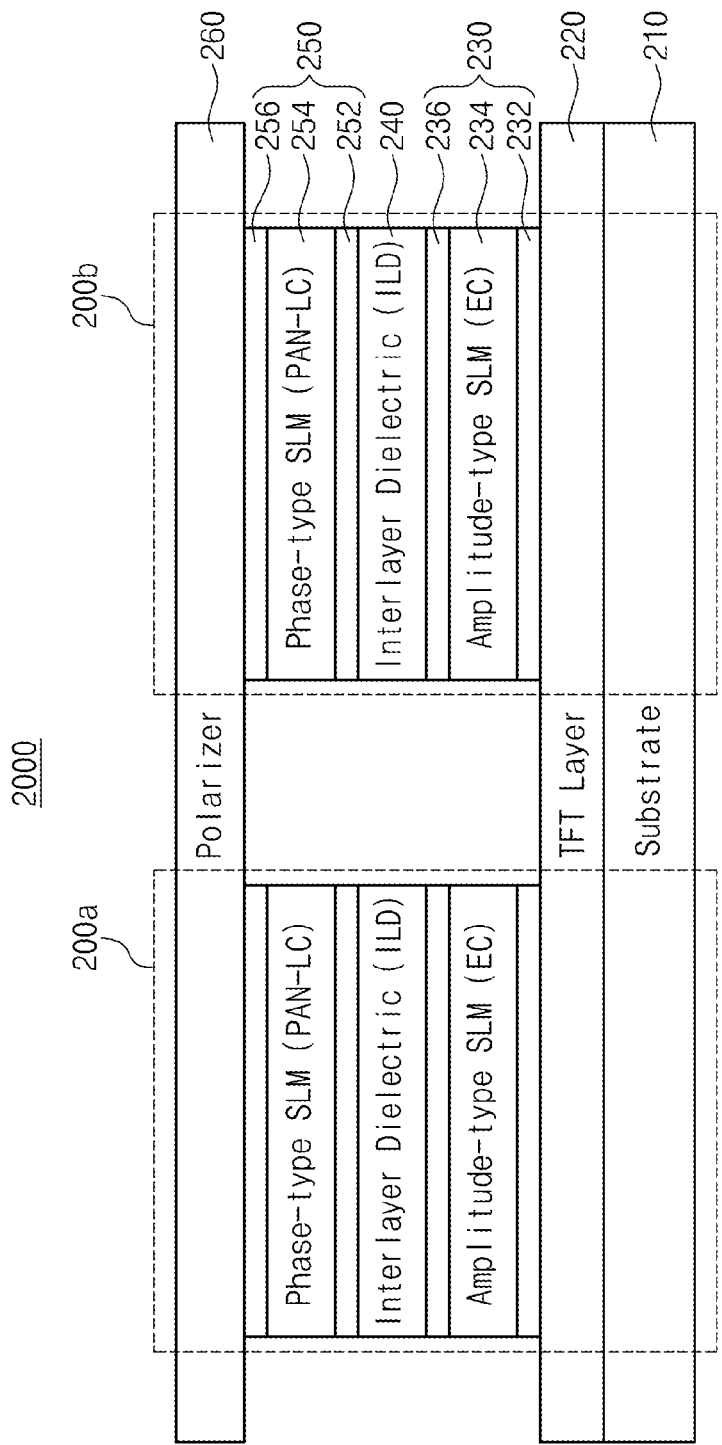
FIG. 2G is a cross-sectional view illustrating a modified example of the complex SLM in FIG. 2A.

FIG. 2G is a cross-sectional view illustrating a modified example of the complex SLM in FIG. 2A. For conciseness of explanation, description about the substantially same elements as those described in relation to FIGS. 2A and 2B may be omitted.

Referring to FIG. 2G, the complex SLM 2000 may include a plurality of complex SLMs arrayed on the substrate 210, for example, first and second complex SLMs 200a and 200b. The first and second complex SLMs 200a and 200b may be configured as identical or similar to the transmissive complex SLM 200 in FIG. 2A. The first and second complex SLMs 200a and 200b may share at least any one of the substrate 210, the TFT layer 220, and the polarizer 260. As an example, the first and second complex SLMs 200a and 200b may share one TFT layer 220. Similarly, the first and second complex SLMs 200a and 200b may share one polarizer 260.

In the present embodiment, the TFT layer 220 may include at least four TFTs. In the first complex SLM 200a, the TFT layer 220 is provided on the substrate 210, and the amplitude type SLM 230 may be provided on the TFT 220. The second complex SLM 200b may also have the same configuration like this. Electrical connections in the first and second complex SLMs 200a and 200b may be identical or similar to those in the transmissive complex SLM 200 illustrated in FIG. 2B.

The complex SLM 2000 may be formed by using a process identical and similar to that described in relation to FIGS. 2C to 2F.

Figure 3A:
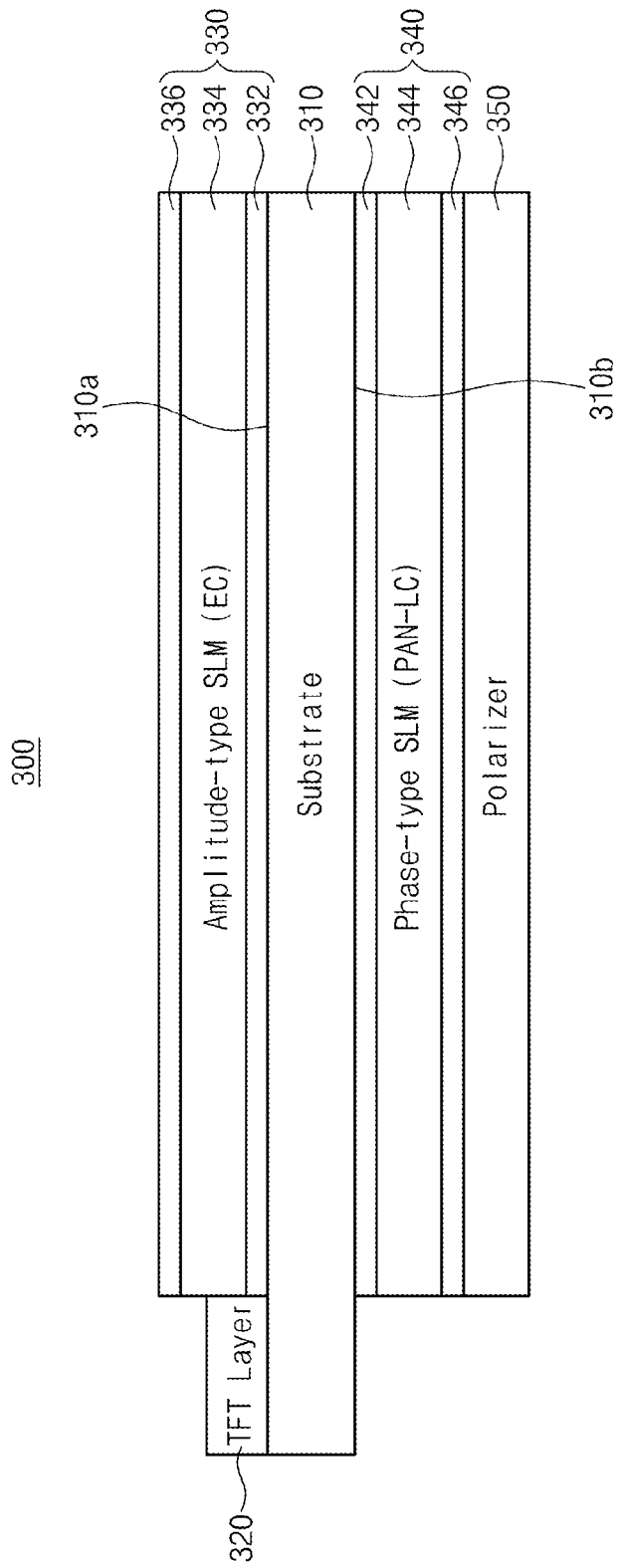
FIG. 3A is a cross-sectional view illustrating a complex SLM according to another embodiment of the present invention.
Figure 3B:
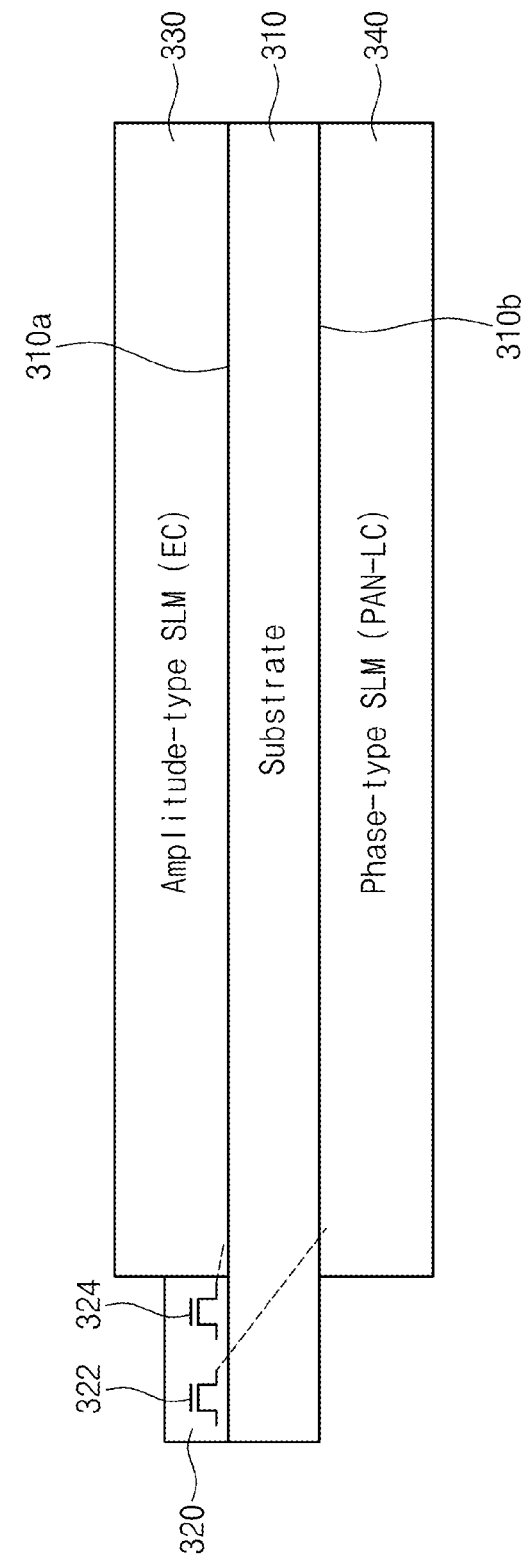
FIG. 3B is a cross-sectional view illustrating electrical connections of the complex SLM in FIG. 3A.

FIG. 3A is a cross-sectional view illustrating a complex SLM according to another embodiment of the present invention. FIG. 3B is a cross-sectional view illustrating electrical connections of the complex SLM in FIG. 3A.

Referring to FIGS. 3A and 3B, a complex SLM 300 may be a transmissive complex SLM including a polarizer 350, a phase type SLM 340, a substrate 310, an amplitude type SLM 330, and a TFT layer 320.

The substrate 310 may include a first surface 310a and a second surface 310b which is opposite to the first surface 310a. The TFT layer 320 and the amplitude SLM 330 may be formed on the first surface 310a of the substrate 310. The TFT layer 320 may be provided to one side of the first surface 310a of the substrate 310 and the amplitude type SLM 330 may be provided to the other side of the first surface 310a of the substrate 310.

The TFT layer 320 may include at two TFTs 322 and 324, as illustrated on FIG. 3B. The TFT layer 320 and the amplitude type SLM 330 may have a smaller width than the substrate 310. The amplitude type SLM 330 may include, for example, an EC device 334, an EC anode 332, and an EC cathode 336. A drain of one TFT 324 in the TFT layer 320 is connected to the EC anode 332 and the TFT layer 320 may be electrically connected to the amplitude SLM 330.

The substrate 310 may have a thickness (e.g., 100 nm). When the substrate 310 is thick, a voltage applied from the TFT 322 in the TFT layer 320 may not be applied to the phase type SLM 340. Therefore, it is preferable to etch the substrate 310 and allow the substrate 310 to have a thin thickness (e.g., not greater than 100 nm). As an example, the TFT layer 320 and the amplitude type SLM 320 are formed on the substrate 310, the substrate 310 is etched and made thin, and then the phase type SLM 340 may be formed.

The phase type SLM 340 may be formed on the second surface 310b of the substrate 310. The phase type SLM 340 may have the same width as the amplitude type SLM 330. When the substrate 310 has a thin thickness, a voltage may be applied from the drain of the TFT 322 in the TFT layer 320 to the LC anode 342. For example, the TFT layer 320 and the phase type SLM 340 are not physically and directly connected and may be electrically connected to each other through the thin substrate 310. When the voltage is applied to the LC anode 342, the phase type SLM 340 may be operated.

The polarizer 350 may be formed on the phase type SLM 340. The polarizer 350 may have the same width as the phase type SLM 340. The polarization direction of the polarizer 350 may be matched with a rubbing direction of the phase type SLM 340.

The transmissive complex SLM 300 of the present embodiment may be operated as follows.

An externally input light may be polarized through the polarizer 350. When a voltage not smaller than a certain voltage is applied, the phase type SLM 340 may have saturated light transmission, a refractive index thereof may become differed despite of constant light transmission as the Equation (1), and then an optical path length may become differed. Accordingly, the light polarized by the polarizer 350 may be changed in phase according to the voltage applied to the phase type SLM 150.

The light polarized and changed in phase by the polarizer 350 and the phase type SLM 340 may be changed in amplitude according to a voltage and a current applied to the amplitude type SLM 330 while passing through the amplitude type SLM 330. For example, an electric field in the transmissive complex SLM 300 may be modulated as the following Equation (4) and may represent complex light modulation characteristics:

$$E = A\exp(iB)$$

where, A denotes amplitude and B denotes a phase.

In the transmissive complex SLM 300, one TFT layer 320 may drive all the amplitude type SLM 330 and the phase type SLM 340. Accordingly, the transmissive complex SLM 300 may reduce energy consumption and a fabrication cost.

FIGS. 3C to 3F are cross-sectional views illustrating a fabricating method of a complex SLM according to another embodiment.

Referring to FIG. 3C, the substrate 310 including a first surface 310a and a second surface 310b which is opposite to the first surface 310a may be provided. The TFT layer 320 may be formed on the first surface 310a of the substrate 310. The TFT layer 320 may be limitedly formed on a part of the top surface of the substrate 310, for example, on an edge of the top surface of the first surface 310a.

Referring to FIG. 3D, the amplitude type SLM 330 may be formed on the first surface 310a of the substrate 310. The amplitude type SLM 330 may be disposed on a side surface of the TFT layer 320 on the first surface 310a of the substrate 310. The amplitude type SLM 330 may be directly and electrically connected to the TFT layer 320.

Figure 3E:
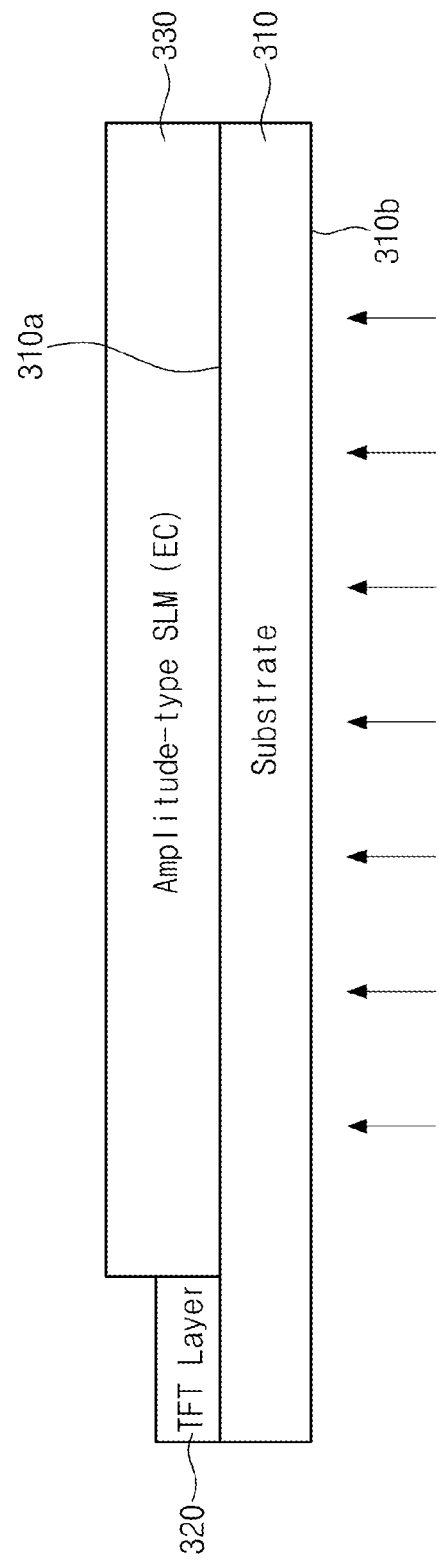

Referring to FIG. 3E, the substrate 310 may be made thin. As an example, the second surface 310b of the substrate 310 may have a thinner thickness (e.g., not greater than 100 nm) than an initial stage.

Figure 3F:
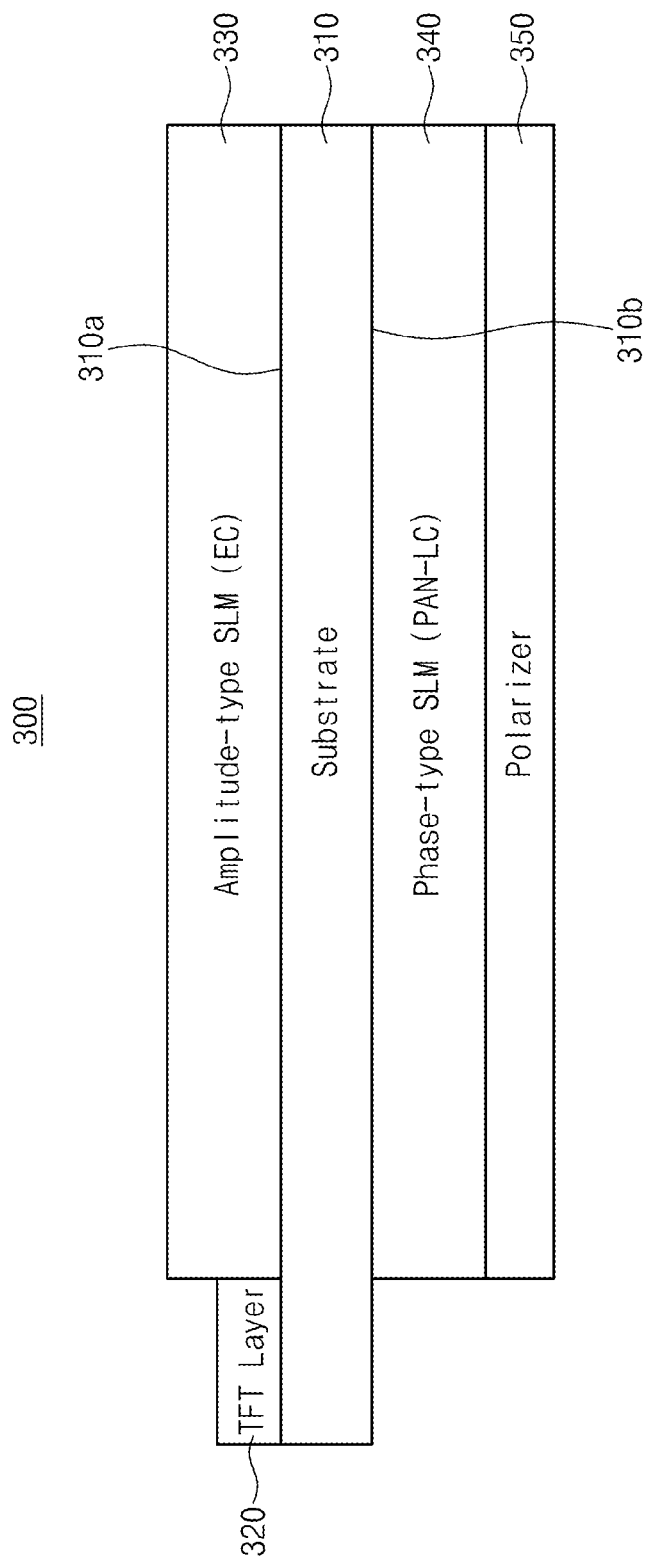

Referring to FIG. 3F, the phase type SLM 340 and the polarizer 350 are sequentially formed on the second surface 310b of the substrate 310. The phase type SLM 340 may not be physically and directly connected to the TFT layer 320 but may be electrically connected through the thin substrate 310. Through the series of processes, the transmissive complex SLM 300 may be fabricated that the amplitude type SLM 330 is disposed on the first surface 310a of the substrate 310 and the phase type SLM 340 is disposed on the second surface 310b of the substrate 310.

Figure 3G:
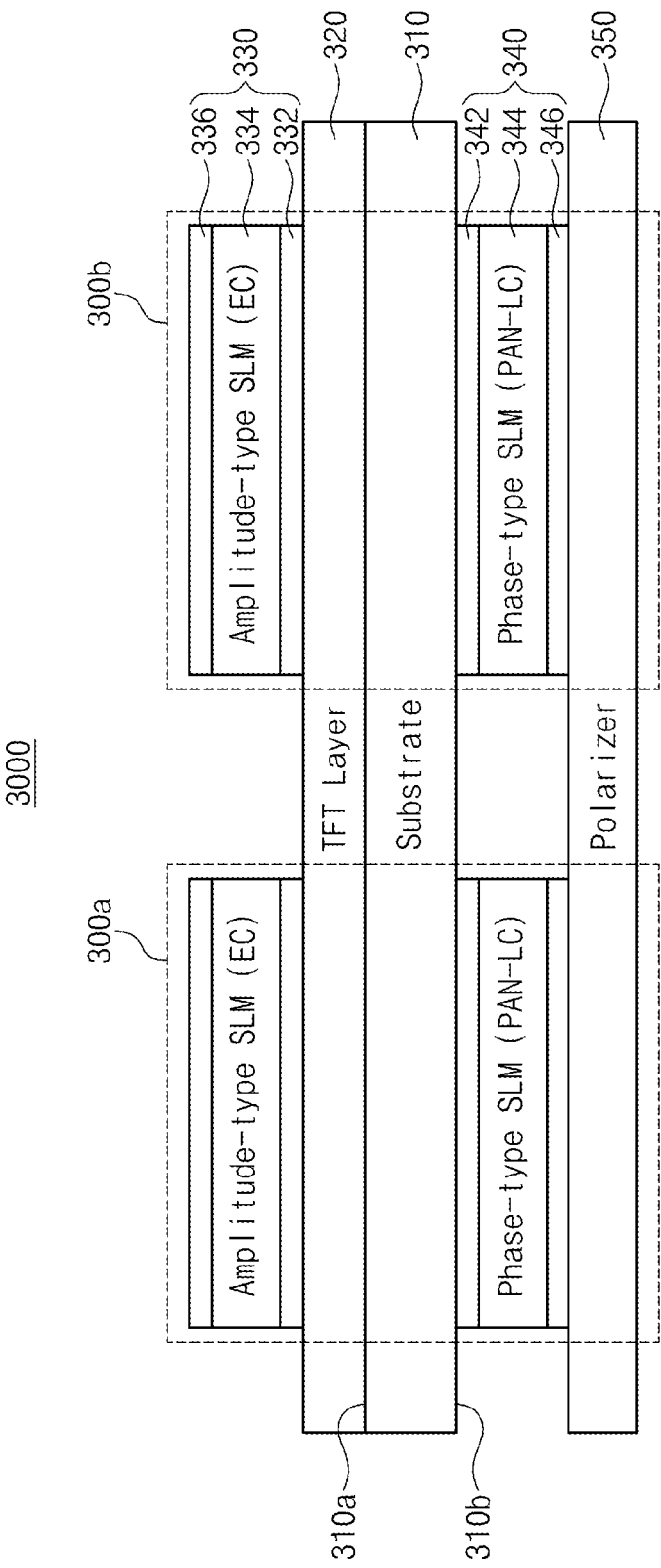
FIG. 3G is a cross-sectional view illustrating a modified example of the complex SLM in FIG. 3A.

FIG. 3G is a cross-sectional view illustrating a modified example of the complex SLM in FIG. 3A. For conciseness of explanation, description about the substantially same elements as those described in relation to FIGS. 3A and 3B is omitted.

Referring to FIG. 3G, the complex SLM 3000 may include a plurality of complex SLMs arrayed on the substrate 310, for example, first and second complex SLMs 300a and 300b. The first and second complex SLMs 300a and 300b may be respectively configured identically or similarly to the transmissive complex SLM 300 in FIG. 3A. The first and second complex SLMs 300a and 300b may share at least one selected from the substrate 310, the TFT layer 320, and the polarizer 350. As an example, the first and second complex SLMs 300a and 300b may share one TFT layer 320. Similarly, the first and second complex SLMs 300a and 300b may share one polarizer 350.

In the present embodiment, the TFT layer 320 may include at least four TFTs. In the first complex SLM 300a, the TFT layer 320 is provided on the substrate 310 and the amplitude type SLM 330 may be provided on the TFT layer 320. The second complex SLM 300b may have the same configuration like this. Electrical connections in the first and second complex SLMs 300a and 300b may be identical or similar to those in the transmissive complex SLM 300 in FIG. 3B.

The complex SLM 3000 may be formed by using a process identical or similar to the process described in relation to FIGS. 3C to 3F.

Figure 4A:
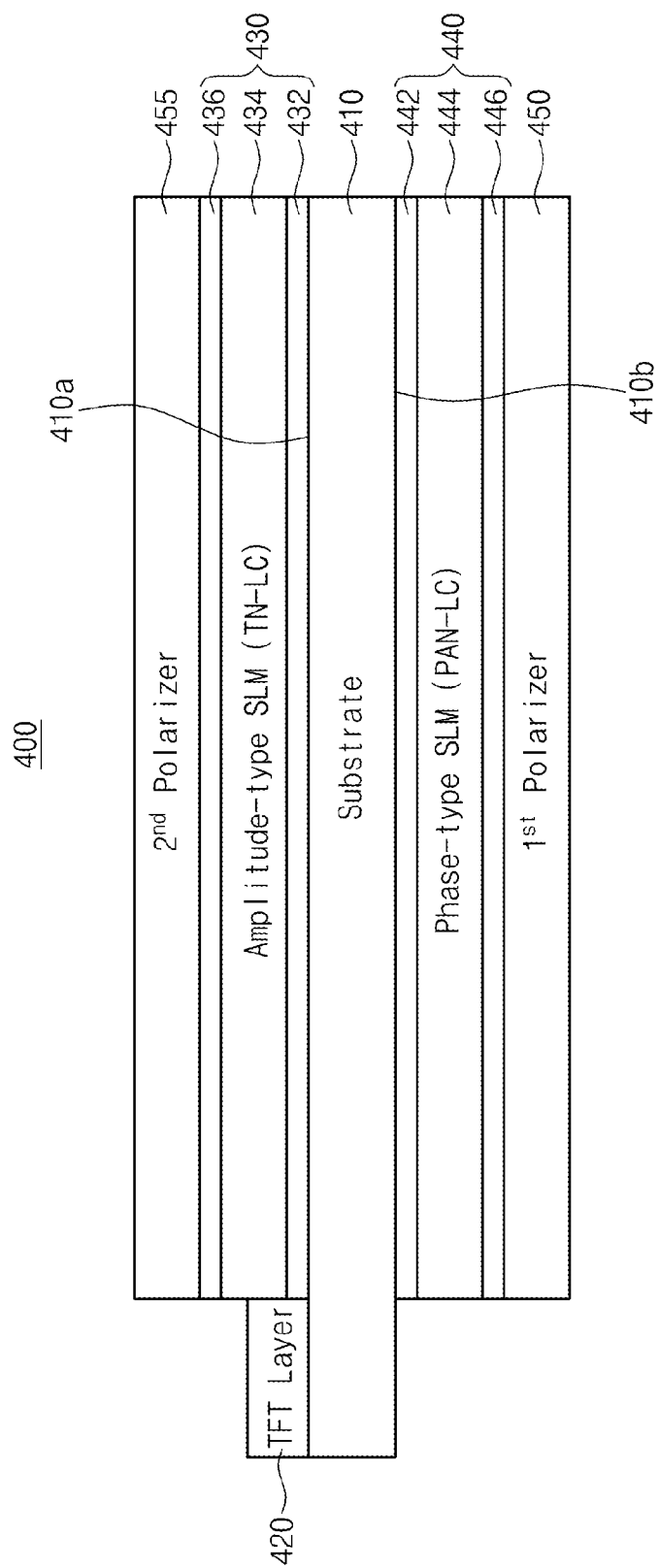
FIG. 4A is a cross-sectional view illustrating a complex SLM according to another embodiment of the present invention.
Figure 4B:
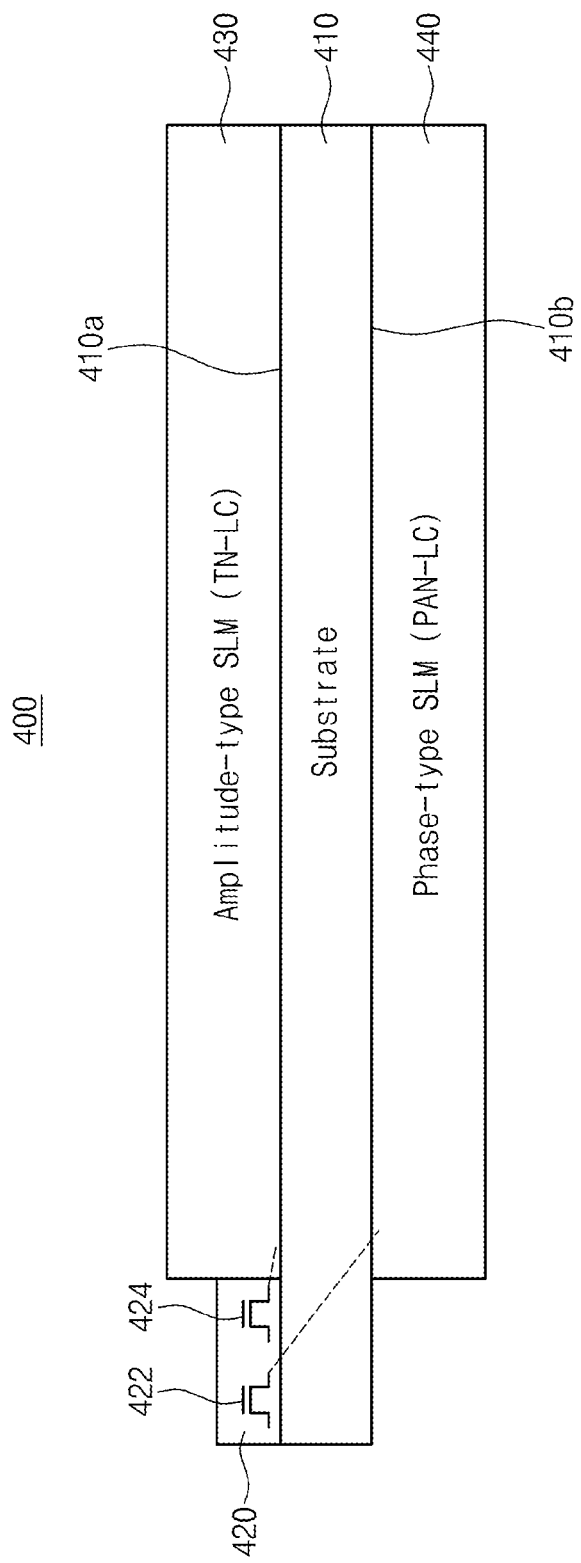
FIG. 4B is a cross-sectional view illustrating electrical connections of the complex SLM in FIG. 4A.

FIG. 4A is a cross-sectional view illustrating a complex SLM according to another embodiment of the present invention. FIG. 4B is a cross-sectional view illustrating electrical connections of the complex SLM in FIG. 4A.

Referring to FIGS. 4A and 4B, a complex SLM 400 may be a transmissive complex SLM. For example, the transmissive complex SLM 400 may include a substrate 410 having a first surface 410a and a second surface 410b which is opposite to the first surface 410a, a TFT layer 420, an amplitude type SLM 430, and a second polarizer 455 provided on the first surface 410a of the substrate 410, and a phase type SLM 440 and a first polarizer 450 provided on the second surface 410b of the substrate 410. Electrical connections between the TFT 422 in the TFT layer 420 and the phase type SLM 440, and electrical connections between the TFT 424 and the amplitude type SLM 430 may be identical or similar to those in the transmissive complex SLM in FIG. 3B.

The amplitude type SLM 430 may include for example, a twisted nematic LC (TN-LC) 434, an LC anode 432, and an LC cathode 436. Since a polarizer is necessary in order for the TN-LC 434 to be used as the amplitude type SLM 430, the second polarizer 455 may be provided on the amplitude type SLM 430. The polarization direction of the second polarizer 455 may be perpendicular to that of the first polarizer 450 on the phase type SLM 440. In addition, the polarization direction of the second polarizer 455 may be matched with a rubbing direction of the amplitude type SLM 430.

The transmissive complex SLM 400 of the present embodiment may be operated as follows.

An externally input light may be polarized through the first polarizer 450. When a voltage not smaller than a certain voltage is applied to the phase type SLM 440, the phase type SLM 440 may have saturated light transmission, a refractive index thereof may become differed despite of constant light transmission, and then an optical path length may become differed. Accordingly, the light polarized by the first polarizer 450 may be changed in phase according to a voltage applied to the phase type SLM 440.

When a voltage and a current are applied to the TN-LC 434 in the amplitude type SLM 140, the light polarized and changed in phase by the first polarizer 450 and the amplitude type SLM 430 may be changed in amplitude according to a voltage applied to the amplitude type SLM 430 while passing through the second polarizer 455. Consequently, an electric field in the transmissive complex SLM 400 may be modulated as the following Equation (5) and may represent complex light modulation characteristics:

$$E = A\exp(iB)$$

where, A denotes amplitude and B denotes a phase.

In the transmissive complex SLM 400, one TFT layer 420 may drive all the amplitude type SLM 430 and the phase type SLM 440. Accordingly, the transmissive complex SLM 400 may reduce energy consumption and a fabrication cost.

FIGS. 4C to 4F are cross-sectional views illustrating a fabricating method of a complex SLM according to another embodiment of the present invention.

Referring to FIG. 4C, a substrate 410 having a first surface 410a and a second surface 410b which is opposite to the first surface 410a is provided. The TFT layer 420 may be formed on the first surface 410a of the substrate 410. The TFT layer 420 may be limitedly formed on a part of the first surface 410a, for example, on the top surface edge of the first surface 410a.

Referring to FIG. 4D, the amplitude type SLM 430 and the second polarizer 455 may be sequentially stacked on the first surface 410a of the substrate 410. The amplitude type SLM 430 and the second polarizer 455 may be formed on the side surface of the TFT layer 420 on the first surface 410a of the substrate 410. The amplitude type SLM 430 may be directly and electrically connected to the TFT layer 420.

Figure 4E:
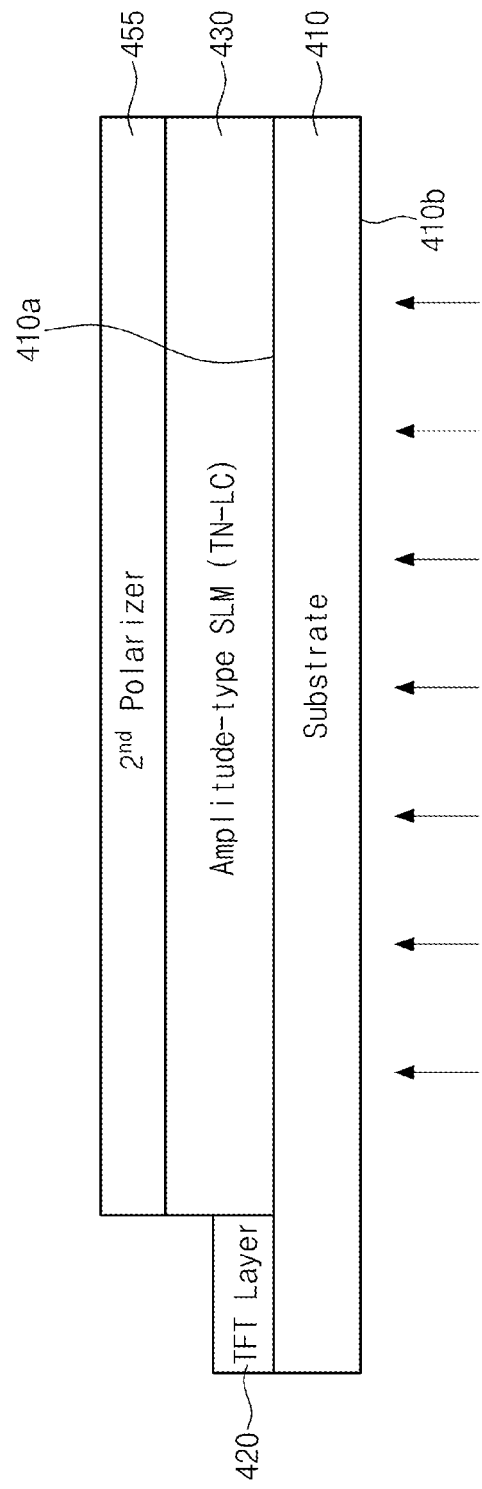

Referring to FIG. 4E, the substrate 410 may be thinly (e.g., not greater than 100 nm) etched. When the substrate is thick, a voltage applied from the TFT layer 420 may not be applied to the phase type SLM 440. Therefore, it is preferable to etch the substrate and allow the substrate to have a thin thickness (e.g., not greater than 100 nm).

Figure 4F:
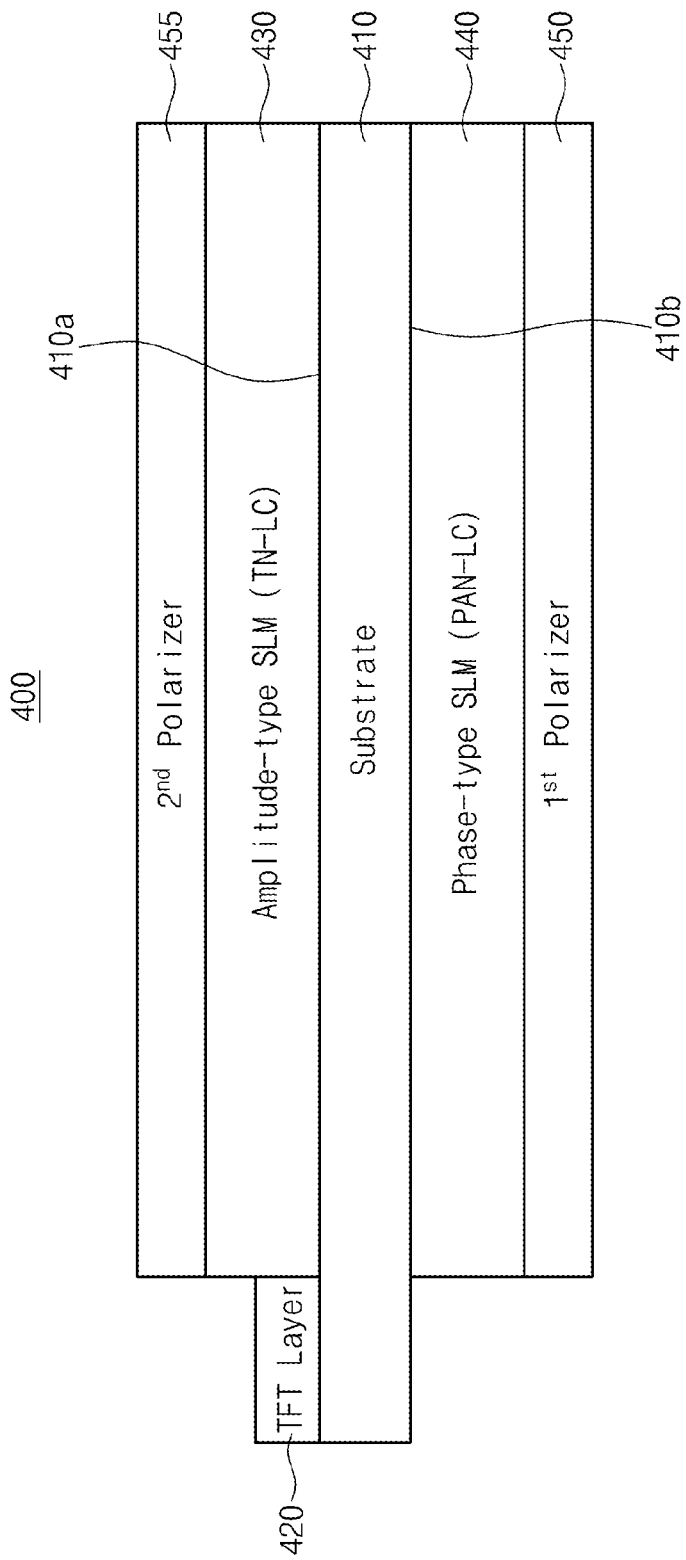

Referring to FIG. 4F, the phase type SLM 440 and the first polarizer 450 may be sequentially stacked on the second surface 410b of the substrate 410. The phase type SLM 440 may not be directly and physically connected to the TFT layer 420, but electrically connected through the thin substrate 410. Accordingly, the transmissive complex SLM 400 may be fabricated that the amplitude type SLM 430 may be disposed on the first surface 410a of the substrate 410, and the phase type SLM 440 may be disposed on the second surface 410b of the substrate 410.

Figure 4G:
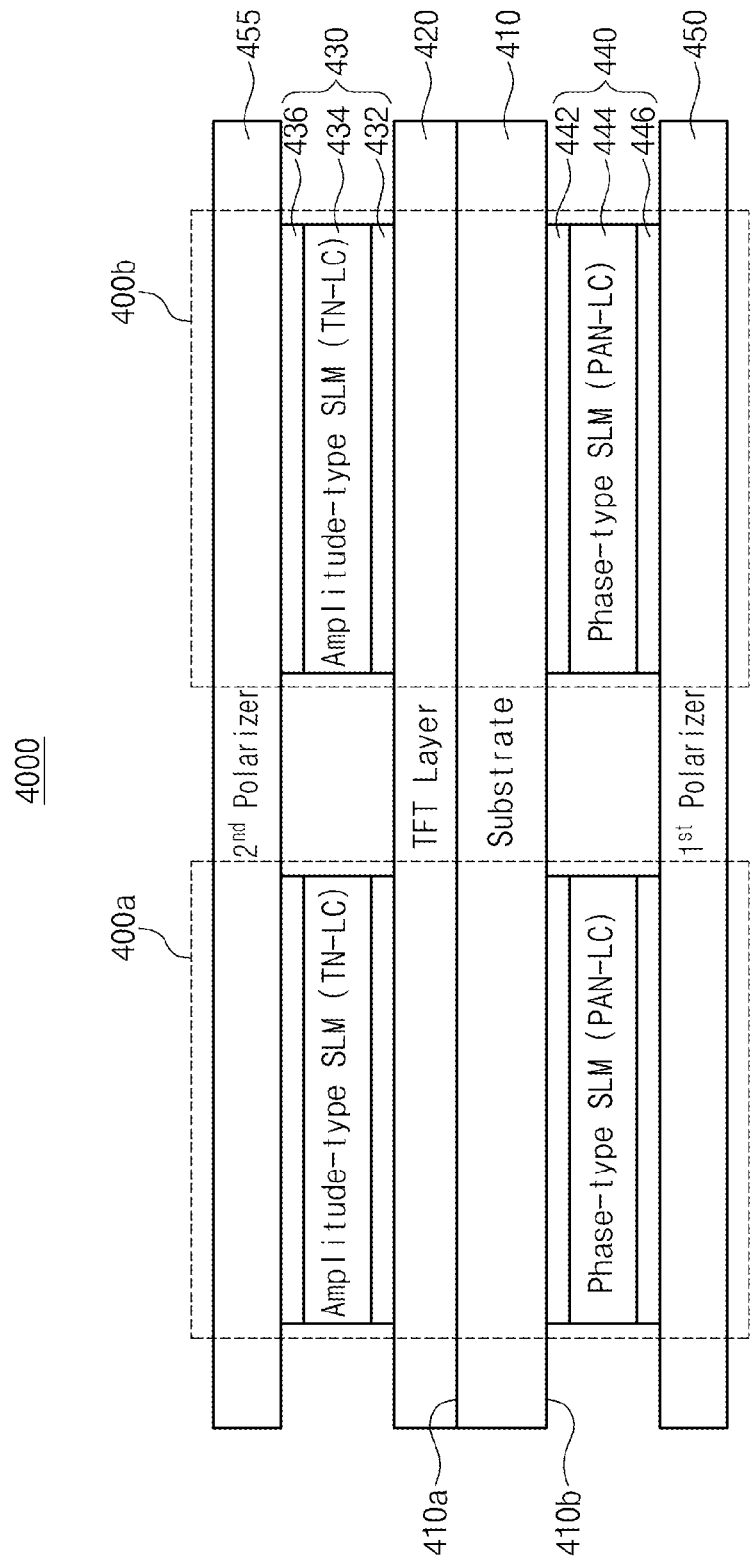
FIG. 4G is a cross-sectional view illustrating a modified example of the complex SLM in FIG. 4A.

FIG. 4G is a cross-sectional view representing a modified example of the complex SLM in FIG. 4A. For conciseness of explanation, description about the substantially same elements as those described in relation to FIGS. 4A and 4B is omitted.

Referring FIG. 4G, the complex SLM 4000 may include a plurality of complex SLMs arrayed on the substrate 410, for example, first and second complex SLMs 400a and 400b. The first and second complex SLMs 400a and 400b may be respectively configured as identical or similar to the complex SLM 400 in FIG. 4A. The first and second complex SLMs 400a and 400b may share at least one selected from substrate 410, the TFT layer 420, the first polarizer 450, and the second polarizer 455. As an example, the first and second complex SLMs 400a and 400b may share one TFT layer 400a and 400b. Similarly, the first and second complex SLMs 400a and 400b may share the first polarizer 450 and/or the second polarizer 455.

In the present embodiment, the TFT layer 420 may include at least four TFTs. In the first complex SLM 400a, the TFT layer 420 is provided on the substrate 410, and the amplitude type SLM 430 may be provided on the TFT layer 420. The second complex SLM 400b may have a similar configuration like this. Electrical connections in the first and second complex SLMs 400a and 400b may be identical or similar to those in the transmissive complex SLM 400 in FIG. 4B.

The complex SLM 4000 may be formed by using a process identical or similar to that described in relation to FIGS. 4C to 4F.

A complex SLM according to an embodiment can solve an alignment limitation by fabricating two SLMs in one device.

A complex SLM according to an embodiment can reduce energy consumption since it is driven by a one-layered thin film transistor (TFT)

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A complex spatial light modulator (SLM) comprising:
   a thin film transistor (TFT) layer provided on a substrate;
   an amplitude type SLM and a phase type SLM electrically connected to the TFT layer; and
   a first polarizer provided on an outside of the phase type SLM,
   wherein the TFT layer includes transistors electrically connected to the amplitude type SLM and the phase type SLM, respectively,
   wherein the amplitude type SLM and the phase type SLM are commonly and electrically connected to the TFT layer and driven, and
   wherein the first polarizer, the phase type SLM, the substrate, the TFT layer and the amplitude type SLM are stacked in this order.

2. The SLM of claim 1, wherein the phase type SLM comprises parallel-aligned nematic liquid crystal (PAN-LC).

3. The SLM of claim 2, wherein the amplitude type SLM comprises an electrochromic (EC) device.

4. The SLM of claim 2, wherein the amplitude type SLM comprises a twisted nematic LC (TN-LC).

5. The SLM of claim 1, wherein the amplitude type SLM is provided on a first surface of the substrate and the phase type SLM is provided on a second surface which is opposite to the first surface.

6. The SLM of claim 5, further comprising a second polarizer provided on the amplitude type SLM.

7. The SLM of claim 1, wherein:
   the phase type SLM includes an anode, a liquid crystal, and a cathode; and
   the anode, the liquid crystal, the cathode, and the first polarizer are stacked on the substrate in this order.

8. A complex SLM comprising:
   a TFT layer provided on a substrate;
   a plurality of light modulator sets electrically connected to the TFT layer; and a first polarizer provided on the plurality of light modulator sets, wherein each of the plurality of light modulator sets comprises an amplitude type SLM and a phase type SLM electrically connected to the TFT layer, and the amplitude type SLM and the phase type SLM are commonly and electrically connected to the TFT layer and driven.

9. The complex SLM of claim 8, wherein the substrate comprises a first surface on which the TFT layer is provided and a second surface which is opposite to the first surface,
a plurality of amplitude type SLMs included in the plurality of light modulator sets are disposed on the TFT layer provided on the first surface of the substrate, and
a plurality of phase type SLMs included in the plurality of light modulator sets are disposed on the second surface of the substrate.

10. The complex SLM of claim 8, wherein the substrate comprises a first surface on which the TFT layer is provided and a second surface which is opposite to the first surface,
a plurality of amplitude type SLMs included in the plurality of light modulator sets are disposed on the TFT layer provided on the first surface of the substrate, and
a plurality of phase type SLMs included in the plurality of light modulator sets are disposed on the plurality of amplitude type SLMs.

11. A fabricating method of a complex SLM, comprising:
forming a TFT layer on a substrate;
forming an amplitude type SLM and a phase type SLM electrically connected to the TFT layer; and
forming a first polarizer on an outside of the phase type SLM,
wherein the first polarizer, the phase type SLM, the substrate, the TFT layer and the amplitude type SLM are formed to be stacked in this order.

12. The fabricating method of claim 11, wherein the forming of the amplitude type SLM and the phase type SLM comprises:
forming the amplitude type SLM on a first surface of the substrate; and
forming the phase type SLM on a second surface which is opposite to the first surface on the substrate.

13. The fabricating method of claim 12, further comprising etching the substrate and making the substrate thin after the forming of the amplitude type SLM.

14. The fabricating method of claim 12, further comprising forming a second polarizer on the amplitude type SLM after the fabricating of the amplitude type SLM.

15. The fabricating method of claim 11, wherein:
the phase type SLM includes an anode, a liquid crystal, and a cathode; and
the anode, the liquid crystal, the cathode, and the first polarizer are stacked on the substrate in this order.

* * * * *